May 28, 1968 — A. S. DOROSZ ET AL — 3,385,470

CONTAINERS

Filed Jan. 21, 1966

*Inventors*
Adolph S. Dorosz
John E. Walsh
By their Attorney

United States Patent Office 3,385,470
Patented May 28, 1968

3,385,470
CONTAINERS
Adolph S. Dorosz and John E. Walsh, Beverly, Mass., assignors to United Shoe Machinery Corporation, Boston, Mass., a corporation of New Jersey
Filed Jan. 21, 1966, Ser. No. 522,245
14 Claims. (Cl. 220—67)

The present invention relates to containers and more specifically to containers fitted with closures produced from synthetic polymeric materials.

Containers, and particularly those commonly referred to as cans are generally provided with metal end closures. In attaching metal end closures, particularly where tight sealing is desired, it has been the practice to crimp on the closure and, as further insurance, include in the closure joint a quantity of gasketing material. The latter may also serve some adhesive function. Various synthetic polymeric latices have been used for this purpose.

Where foodstuffs, which include various potable liquids, are the contents involved, the problem of obtaining good sealing in cans is particularly difficult. This is for the reason that in canning many of these, the operations of autoclaving, pasteurizing, sterilizing, etc., at elevated temperatures, are carried out after the contents have been enclosed in the containers. As a result considerable pressure is developed within the containers. Upon removal from these operational environments, for example, the autoclave, the pressure differential then developed between the inside of a container and the atmosphere may and often does cause leaks to develop at the closure joints. This, of course, results in a can and contents which must be discarded.

Recently, interest has developed in the use of closures produced of synthetic polymeric materials; examples, polyethylene, polyvinyl chloride, etc. Their use, however, has been restricted to containers for contents which do not require a high degree of, and, which are not subjected to temperature processing or treatment after enclosure in the containers. This is for the reason that it has been difficult to obtain sufficiently strong or complete closure joints between these closures and the containers using either or both crimping and, or adhesives. Synthetic polymeric materials are resistant to effective crimping as such because of their plastic memory characteristics, and they are difficult to adhere to using adhesives and adhesive processing of the type conveniently produced and practiced.

It is an object of this invention to provide containers having closures formed of synthetic polymeric material.

It is another object of this invention to provide containers having closures of synthetic polymeric materials in which the closure joints show improved sealing qualities or resistance to leaking.

It is another object of this invention to provide containers having closures of synthetic polymeric materials in which the closure joints obtained between the closures and the container bodies retain good sealing qualities after temperature processing of the containers and contents are carried out.

It is another object of this invention to produce containers, including closures of synthetic polymeric material having improved closure joints resulting from the use of convenient adhesives and adhesive processes.

These and other objects of this invention are attained in a container including in combination a container body and an end closure of synthetic polymeric material in a particular closing relationship. This relationship is effected through use of a tubular container body having a tapered end, and a closure including a skirt projecting in such a manner which allows it to overlie the tapered end of the container body when the closure is located in closing relationship to that end. Adhesive is provided to effect adhesive attachment between the overlying skirt and the tapered end of the container body.

The method for producing the containers, as described, may be practiced in the following manner. (a) The closure of synthetic polymeric material is positioned over the end of the container body so as to locate the skirt of the closure in overlying relationship to the tapered end of the container body. (b) The adhesive located between the skirting and the tapered end is activated to provide it in fluid condition. (c) Then, the skirting is contacted with the tapered end to provide adhesive attachment between the skirt and the tapered end of the container body.

The containers which may be obtained from practice of the present invention are those which include various tubular container bodies. Included are container bodies of the type used in containers commonly referred to as cans or tin cans. These are produced from sheet iron or steel stock, and generally they are provided with a lacquered surface to protect them from attack either by the elements or the contents. Lacquers used for this purpose now include for the most part those based on synthetic polymeric materials such as vinyl chloride, acrylate and various synthetic polymeric latices which may be sprayed or dipped on. Also intended are the more recently devised can bodies produced from aluminum sheet stock or aluminum-paper sheet stock. The term "tubular" when used to define the container bodies is intended to include container bodies of a number of cross-sectional and longitudinal shapes and variations in the same. As an example the cross sectional shape of the body may be in the form of a circle, oval, square, rectangular and similarly other shapes. Then too the cross-section of a container body may be varied as to shape and size along the longitudinal axes of the same. The container bodies may be produced in any convenient manner; such as by molding, seaming, spinning, spiral winding, etc.

In order to provide the container having a tubular container body and closure in the closing relationship prescribed by this invention, the container body is provided with a tapered portion at the end to be closed. This tapered end portion which is located between a knee or knee portion provided on or in the container body and the end opening, may also be considered as a zone or area which in effect circumscribes the end opening to be closed. The length and taper angle of the tapered end portion may vary as determined on the amount of shear strength required to resist the internal pressure anticipated in the container when in closed condition. A taper angle of about 5 degrees on a taper length of about 0.25 inch operates well in those cases in which temperature processing of the usual type, i.e., involving temperatures of almost 120° F. and internal pressures of 100 p.s.i. are anticipated. Other considerations involved here include the size and shape of the container body and the closure, as well as the particular material used to produce the container body, closure and adhesive to be used.

A container body may include a number of end openings to be closed and in accordance with that when closure is to be effected according to this invention, the end openings to be closed are each provided with a tapered configuration.

In addition to providing a situs for carrying out the desired type of end closure, the taper may also serve to strengthen the container body, giving it greater structural stability and thereby contribute to the ability of the closure joint provided in the practice of this invention to withstand internal pressure, handling, damage, etc.

In producing the containers as prescribed, the closure used is one formed from a synthetic polymeric material.

This includes polyolefins such as the polyethylenes, homopolymers and copolymers, also low density, medium density and high density polyethylenes; polypropylenes, both homopolymers and copolymers, as well as other synthetic polymeric materials such as the polyvinyl chlorides homopolymers and copolymers, as well as those of vinyl chloride and vinyl acetate, etc.; acrylate polymers and copolymers such as those based on the acrylates, and methacrylates; vinylidene chlorides, etc.

The cross-sectional or outline shape of the closure may be any which correspond with that of the container body end to which the closure is to be attached. The closures may be designed to produce permanent closure or temporary closure, such as the closure described in copending application Ser. No. 424,352, filed Jan. 8, 1965, now Patent No. 3,281,007, in the name of Adolph Dorosz.

The closure for use includes a skirt or skirt portion at or as its peripheral portion. The skirt is designed as to size and shape to overlie the tapered end of the container body, when these components are assembled. The specific size and contour of the skirt will then be determined on overall consideration including the size and shape of the container and tapered end of the same to be closed, the contents to be included in the content space of the container and processing and handling conditions to which the container is to be exposed, as well as the nature of the adhesive to be used in attaching the closure to the container body end.

The basic closing relationship between the container body and the end closure is through a combination of specific contour, having reference to taper angle, the geometry provided between the surfaces to be adhesively attached and the adhesion characteristics of the adhesive used. The total result is a closure joint having increased resistance to shear and peel forces developed from pressures built up internally of the container. The adhesive used, however, may include a number of well known adhesives. These include the heat activatable or thermoplastic adhesives such as those based on polyesters, polyamides, polyvinyl acetates, homopolymers and copolymers, etc. Similarly, many solvent activatable adhesives may be used. These include many of the adhesives mentioned above such as the polyesters, polyvinyl acetates, etc. Another group of adhesives which may be used are the thermosetting or curing type adhesives such as the various vulcanizable natural and synthetic rubbers, cross-linkable polyurethanes phenol-formaldehyde, urea-formaldehyde, resorcinol-formaldehyde and similar adhesive compositions.

In providing the desired adhesive attachment, it may be desirable to practice various pretreatment methods such as solvent and reagent scouring, priming, etc. of the surfaces to be adhesively attached. This is particularly a consideration if the parts, i.e., closures and container bodies, have been left in storage for some time and their surfaces have become oxidized, corroded or otherwise adversely affected so far as receiving adhesives is concerned. In other instances those surfaces may have been coated to prevent oxidation, etc. In such instances it may also be desirable to pretreat the surfaces as indicated previously. In other instances, again, it may be desirable to pretreat the surfaces where adhesive attachment is to be carried out with a minor amount of a particularly compatible adhesive or coating having the capacity to facilitate expedient adhesive attachment when assembly is carried out.

In situations where the closures are provided with skirting having greater overlapping area than that required to overlie the tapered end of the container body, it may be desirable to include a quantity of a gasketing material, which may in effect be the same material as the adhesive used. In that regard, the skirting may extend beyond the taper on the container body or it may extend beyond the edge on the container body. Then too, if the skirting is in effect the outside wall of a groove provided on a closure, it may be desirable to provide gasketing material in the groove, at the bottom to prevent break through by the container body end and as well at the inner surface of the groove to protect the end from attack by the contents of the container.

In practicing the method for attaching closures on containers' ends, according to this invention a number of steps are involved.

In the first step the adhesive is applied to the skirting and/or taper and is activated to provide it in fluid condition. The particular type of activation to be used depends upon the nature of the adhesive used, thermoplastic, thermosetting or solvent-activatable.

The second of these steps involves positioning the closure over the tapered end of the container to be closed. This step further requires that the skirt or skirt portion on the closure be provided in overlying relationship with the tapered end of the container. At the time of carrying out this step more adhesive may be applied to the inside of the skirt and, or the outside of the tapered end of the can. It is preferred practice that the adhesive has been entirely applied and activated prior to assembly. In certain instances it may be desirable to maintain activating conditions thereby allowing longer open time. This is particularly true when the adhesive is the thermoplastic type which is activatable by heating. One way to do this is by heating the can body. This heating can be effected by any convenient means.

In the third step of the method, the skirt and tapered end are brought into contact to provide adhesive attachment between these parts. Various expedients such as pressing and, following that cooling may be used if desired. However, their use is principally to increase production rates rather than improve the product, and more specifically the closure joint obtained through adhesive attachment of the skirt of the closure to the tapered end of the container body.

The following drawings are included in the case to further illustrate the invention in which.

Figure 1:
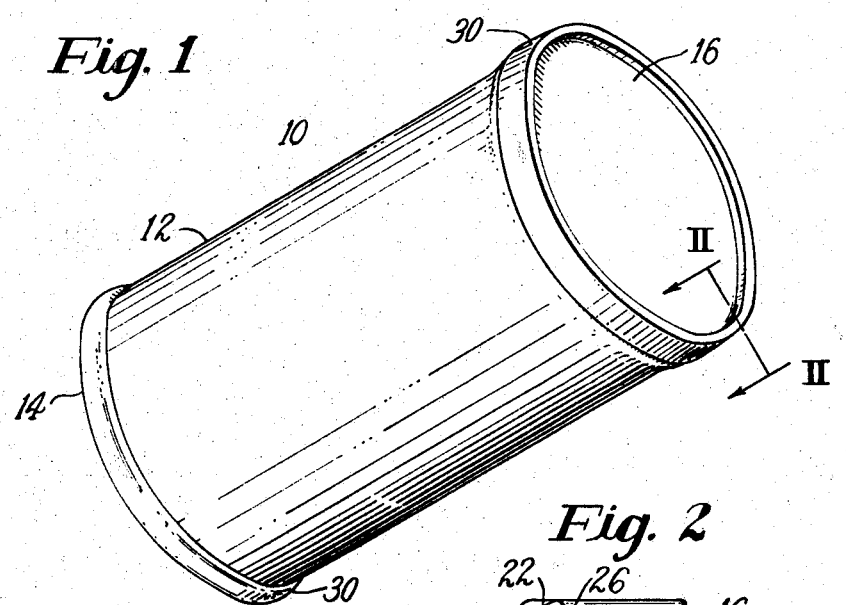
FIG. 1 is a perspective view of a closed container.
Figure 2:
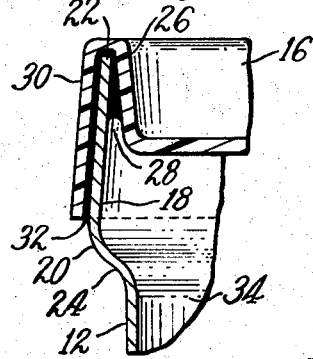
FIG. 2 is a section taken along the line II—II of FIG. 1.
Figure 3:
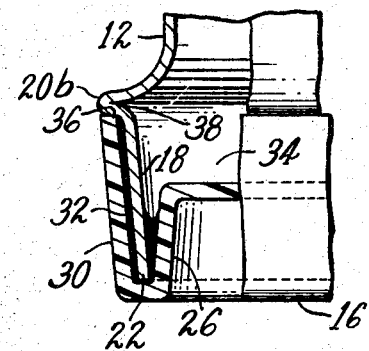
FIG. 3 is a partial view in section, of a closure adhesive attached to a container body.

Referring to the drawings, a container 10 is shown in FIG. 1 including a container body 12 and adhesively attached closure ends 14 and 16. As shown in more detail in FIG. 2, the container body is formed of metal, example, iron, steel, aluminum, etc. and has a tapered end portion 18 extending between the knee 20 and the end 22 of the container body 12. A reentrant angle 24 is formed between knee 20 and the remainder of the container body 12. Tapered portion 18 is shown having a taper angle or angle of taper of about five degrees. Also, as shown in FIG. 2, closure 14 is formed of synthetic polymeric material and has a peripheral flange 26 defining in outline a groove 28 with the outside wall of groove 28 forming a skirt or skirt portion 30. A quantity of adhesive 32 is shown located between skirt portion 30 and tapered end portion 18 providing adhesive attachment between those components. Adhesive 32 is shown in sufficient amount so that it extends around the end 22 of container body 12, serving in that way to protect against breakthrough by end 22 and to isolate the end 22 from the contents, not shown, to be included in the content space 34 defined by container body 12. FIG. 3 shows another embodiment of the invention in which the container body 12 includes a knee 20a which projects outwardly of the tapered end portion 18. Projection is preferably to a point beyond that to which the thickness of skirt 30 causes it to extend. Knee 20a serves to protect the container body 12 as well as the adhesive attachment between the tapered end portion 18 and the closure skirt 30, during shipping, handling, etc. In practicing this embodiment the leading edge 36 of the skirt 30 terminates on container body 12 at or below the end surface 38 of knee 20a. Then in that regard, while edge 36 and surface 38 may be in spaced relationship it is preferred to have the leading edge 36 of the skirt 30 abut or contact the end surface 38 of knee member 20a. In a more specific adaptation of this embodiment, not shown, adhesive attachment may be provided between leading edge 36 and end surface 38.

Figure 4:
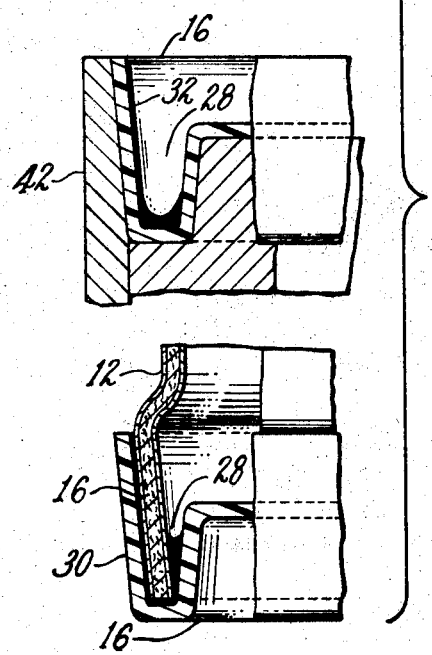
FIG. 4 is a sequence of a number of partial views, in section, designed to illustrate a method for effecting adhesive attachment of a closure to a container body.

FIG. 4 illustrates generally the method for adhesively attaching closure 16 onto container body 12. The first view shows the closure 16, having a skirt 30 projecting at an angle of almost five degrees off normal from the closure panel 40. Stated differently, the skirt 30 has an angle of projection which is essentially complementary to the angle of taper of tapered end portion 16 on container body 12. This expedient eliminates internal stresses of a structural nature from developing within the skirt 30 and in that manner contributes to the desirable contour and geometry described previously with respect to the closure joint obtained by practice of this invention. In the second view the closure 16 has a quantity of adhesive 32 deposited in fluid form within groove 28. Any convenient means and method may be used in applying the adhesive 16. The closure is shown there located within a metal block 42 which can be heated by means, not shown, to maintain the adhesive in fluid form. In the third view within FIG. 4, the tapered end portion 16 of container body 12 is shown having positioned within groove 28 and adhesive attachment between the tapered end portion 16 of container body 12 and skirt 30 effected.

It will thus be seen that the objects set forth above, among those made apparent from the preceding description, are efficiently attained and, since certain changes may be made in the above container and the method for producing same without departing from the scope of the invention, it is intended that all matter contained in the above description and shown in the accompanying drawing shall be interpreted as illustrative and not in a limiting sense.

Having thus described our invention, what we claim as new and desire to secure by Letters Patent of the United States is:

1. In a container the combination of a tubular body and an end closure of synthetic polymeric material, the tubular body having a tapered end portion located between a knee portion provided in the container body and an end opening, the closure including a projecting skirt having an angle of projection essentially complementary to the angle of taper of the tapered end portion and said skirt adhesively attached in overlying relationship to said tapered end portion.

2. In a container according to claim 1 wherein the tapered end portion is at an angle of about five degrees.

3. In a container according to claim 1 wherein the container body is metal.

4. In a container according to claim 3 wherein the metal is steel.

5. In a container according to claim 3 wherein the metal is aluminum.

6. In a container according to claim 1 wherein the container body as a metal-paper laminate.

7. In a container according to claim 1 wherein the polymeric material is polyethylene.

8. In a container according to claim 1 wherein the polymeric material is polyvinyl chloride.

9. In a container according to claim 1 wherein said tapered end portion is adhesively attached to the skirt through a thermoplastic adhesive.

10. In a container according to claim 1 wherein said tapered end portion is adhesively attached to the skirt through a thermosetting adhesive.

11. In a container according to claim 1 wherein said tapered end portion is adhesively attached to the skirt through a solvent activatable adhesive.

12. In a container the combination of a tubular body and an end closure of synthetic polymeric material, the tubular body having a tapered end portion extending between an end of said tubular body to an outwardly projecting knee provided on said tubular body, the closure including a projecting skirt having an angle of projection essentially complementary to the angle of taper of said tapered end portion and terminating in a leading edge having a thickness of which is less than the projection of said knee, the said skirting adhesively attached in overlying relationship to said tapered end portion with the leading edge terminating below said knee.

13. In a container according to claim 12 wherein the leading edge of the skirt contacts the end surface of the knee.

14. In a container according to claim 13 wherein adhesive attachment is provided between the leading edge of the skirt and the end surface of the knee.

References Cited

UNITED STATES PATENTS 2,857,076   10/1958   Tolbert et al. _____ 220—67

THERON E. CONDON, *Primary Examiner.*

JAMES B. MARBERT, *Examiner.*